(12) United States Patent
Glassock

(10) Patent No.: US 6,861,024 B2
(45) Date of Patent: Mar. 1, 2005

(54) METHOD OF MANUFACTURING A RELEASE SHEET FOR USE WITH MULTICOMPONENT REACTIVE URETHANE SYSTEMS

(75) Inventor: Judith I. Glassock, Portland, ME (US)

(73) Assignee: S. D. Warren Company, Boston, MA (US)

( * ) Notice: Subject to any disclaimer, the term of this patent is extended or adjusted under 35 U.S.C. 154(b) by 388 days.

(21) Appl. No.: 10/001,444

(22) Filed: Oct. 31, 2001

(65) Prior Publication Data

US 2002/0076500 A1 Jun. 20, 2002

Related U.S. Application Data

(62) Division of application No. 09/111,447, filed on Jul. 8, 1998, now Pat. No. 6,355,343.

(51) Int. Cl.[7] ............................................. B29C 41/22
(52) U.S. Cl. ................. 264/496; 264/130; 264/134; 264/293; 264/296; 264/255
(58) Field of Search ..................... 264/130, 496, 264/134, 293, 296, 255

(56) References Cited

U.S. PATENT DOCUMENTS

| | | | | |
|---|---|---|---|---|
| 4,289,821 A | * | 9/1981 | Gray et al. | 428/172 |
| 4,311,766 A | * | 1/1982 | Mattor | 428/514 |
| 4,322,450 A | * | 3/1982 | Gray et al. | 427/504 |
| 4,327,121 A | * | 4/1982 | Gray, III | 427/505 |
| 4,681,714 A | * | 7/1987 | Lopes et al. | 264/46.6 |
| 4,840,757 A | * | 6/1989 | Blenkhorn | 264/485 |
| 4,876,153 A | * | 10/1989 | Thorfinnson | 427/447 |
| 5,279,689 A | * | 1/1994 | Shvartsman | 156/220 |
| 5,518,818 A | * | 5/1996 | Kidai et al. | 428/412 |
| 5,772,905 A | * | 6/1998 | Chou | 216/44 |
| 5,861,113 A | * | 1/1999 | Choquette et al. | 264/1.24 |
| 6,193,898 B1 | * | 2/2001 | Kano et al. | 216/23 |
| 6,309,580 B1 | * | 10/2001 | Chou | 264/338 |
| 6,656,398 B2 | * | 12/2003 | Birch et al. | 264/85 |

* cited by examiner

*Primary Examiner*—Edmund H. Lee
(74) *Attorney, Agent, or Firm*—Briana K. O'Regan

(57) ABSTRACT

A flexible composite release sheet providing a replicative surface with a desired surface effect and a method of manufacturing such a release sheet is disclosed. The release sheet is suitable for use in multicomponent reactive urethane casting systems. The invention further provides flexible composite release sheets having a first acrylic functional coating layer containing the desired surface effect and a second silicone release coating layer overlying the acrylic functional coating layer.

17 Claims, 3 Drawing Sheets

METHOD OF MANUFACTURING A RELEASE SHEET FOR USE WITH MULTICOMPONENT REACTIVE URETHANE SYSTEMS

This application is a divisional of U.S. patent application Ser. No. 09/111,447 filed Jul. 8, 1998, now U.S. Pat. No. 6,355,343.

BACKGROUND OF THE INVENTION

The present invention relates to a flexible composite release sheet providing a replicative surface with a desired surface effect. More particularly, the present invention relates to a composite release sheet providing a replicative surface with a desired surface effect for use in multicomponent reactive urethane systems. The present invention further relates to a method of manufacturing such a release sheet. The term "surface effect," as used herein, is intended to encompass three dimensional relief patterns, textures, or embossures, and essentially flat finishes, such as highly glossy mirror finish.

A number of processes exist in which a plastic film or sheet is formed on or against a release sheet and then separated from the release sheet after cooling or curing to set the plastic material. Curing, where necessary, may be accomplished by heat, by peroxide catalyst, by ultraviolet (UV) radiation or by electron beam radiation. The release sheet provides a surface from which the set plastic material can be readily separated and imparts to the surface of the plastic material the quality of finish of the release surface. For example, a desired textured surface can be provided on the surface of the plastic material by forming the plastic material on or against a release sheet having a textured surface that is the mirror image of the desired textured surface.

One example of such forming processes is "casting", wherein a resinous material, such as polyvinyl chloride or polyurethane resin, in a flowable state, is deposited or "cast" onto the release sheet surface, heated, cured and cooled to consolidate the resinous material into a continuous self-supporting film, and stripped from the release sheet. The release sheet is normally provided with a desired surface effect, such as high gloss, texturing or an embossed configuration, and the surface effect is replicated on the cast film.

A more specialized casting method involves using multicomponent reactive urethane systems as the resinous material. In general, polyurethane casting materials are formed by reacting a diisocyanate and a polyol to form a urethane. Film properties of the polyurethane can be tailored for specific end-uses by varying the proportions and the chemistry of the diisocyanate and polyol components. Most polyurethanes are used in the "neat" or pre-reacted form. Multicomponent reactive urethanes, however, are not pre-reacted before casting. The diisocyanate and polyol components, as well as other additives such as crosslinkers and accelerators, are applied to the substrate as individual entities. The reaction occurs in situ.

Release sheets for use in the above-described casting processes are typically made by coating, treating, or impregnating a paper sheet or other substrate with a release coating comprised of such materials as polymethylpentene, polypropylene, polyfluorocarbons, silicone oil, thermoset silicone resins, and other conventional release agents. Surface effects on the release sheet are conventionally provided by any one of a number of techniques. The release coating can be dried to a smooth surface gloss, or surface effects such as texturing or embossing can be provided in the coating by mechanical means, applied either to the surface of the paper before coating or to the paper after the coating is applied.

U.S. Pat. No. 4,289,821 (Gray et al.) and U.S. Pat. No. 4,322,450 (Gray et al.), the disclosures of which are incorporated herein by reference, disclose techniques for producing surface effects in a release coating on a release sheet for use in casting processes. One method disclosed comprises applying a coating of an electron beam radiation curable material to one surface of a web substrate, pressing the coated side of the substrate against a replicative surface having the desired surface effect to cause the coating to conform to the replicative surface, irradiating the coating with electron beam radiation to cure the coating, and stripping the substrate from the replicative surface with the cured coating adhered to the substrate. The replicative surface is preferably a metal roll with either a pattern engraved in its surface or a highly polished smooth surface. An important advantage of this technique is that the pattern or finish of the replicative surface is reproduced in the cured coating with essentially 100% fidelity. This technique enables replication of very fine patterns, such as wood grain and leather grain, on the surface of a plastic cast onto the release sheet.

U.S. Pat. No. 4,311,766 (Mattor) and U.S. Pat. No. 4,327,121 (Gray), the disclosures of which are incorporated herein by reference, disclose electron beam curable coating compositions comprising acrylic functional materials and silicone release agents. Such coatings may be used, e.g., in the processes described in U.S. Pat. Nos. 4,289,821 and 4,322,450, to reproduce a replicative surface in a release sheet with substantially 100% fidelity.

Release sheets using acrylic functional release coatings have been used successfully with casting systems that employ, for instance, polyvinyl chloride or pre-reacted polyurethane. These release sheets, however, typically do not provide adequate release properties when used with multicomponent reactive urethane casting systems.

Some release sheets work well with multicomponent reactive urethane casting systems, such as release sheets manufactured from extruded polypropylene or poly-4-methyl pentene. These release sheets, however, tend to lack the fidelity of replication achieved by the release sheets described in the above mentioned patents. A need remains for release sheets providing a replicative surface with a desired surface effect at substantially 100% fidelity for use in multicomponent reactive urethane casting systems.

SUMMARY OF THE INVENTION

The present invention provides flexible composite release sheets providing a replicative surface with a desired surface effect. The invention further provides flexible composite release sheets for use in multicomponent reactive urethane casting systems. The invention further provides flexible composite release sheets having a first acrylic functional coating layer containing the desired surface effect and a second aqueous silicone release coating layer overlying the acrylic functional coating layer. The invention also provides methods for manufacturing such flexible composite release sheets.

In one aspect, the invention provides a flexible composite release sheet comprising:
a) a substrate;
b) an acrylic functional coating layer provided on at least one surface of the substrate, containing said surface effect; and c) a silicone release coating layer provided on the acrylic functional coating layer, such that the continuity of said release layer is maintained, acceptable release of the cast film from said silicone release coating is achieved and alteration of said underlying desired surface effect is minimized.

Preferred embodiments include one or more of the following features. The substrate is paper. The acrylic functional coating is preferably an electron beam polymerized acrylic functional coating. The acrylic functional coating preferably comprises an acrylated oligomer, a monomer selected from a group consisting of monofunctional acrylate, multifunctional acrylate and mixtures thereof, and 2% or less by total weight of the solid coating of a siloxane release agent. The siloxane release agent is preferably an aminofunctional siloxane release agent. The aminofunctional siloxane release agent is preferably less than 1%, more preferably less than 0.25% and most preferably completely removed from the acrylic functional coating.

The silicone release coating layer preferably comprises 90 parts or less polyvinyl alcohol, 100 parts or less of a complex reactive organofunctional siloxane release modifier, 90 parts or less of a reactive organofunctional siloxane emulsion coating, 10 to 20 parts of a catalyst selected from a group consisting of platinum complex and tin complex, and 2 to 12 parts of a nonionic surface wetting agent containing polyoxyethylene groups. The nonionic surface wetting agent is preferably a silicone glycol copolymer wetting agent. The catalyst is preferably a platinum complex catalyst. The term "parts" as used herein means parts on a dry solids basis.

In another aspect, the invention provides a method of manufacturing a flexible composite release sheet by:
a) applying an acrylic functional coating layer to a substrate;
b) pressing the coated side of the substrate against a replicative surface to cause the coating to conform with the replicative surface;
c) curing the acrylic functional coating layer;
d) stripping the cured coated substrate from the replicative surface;
e) applying a silicone release coating layer on the acrylic functional coating layer; and
f) curing the silicone release coating layer.

Preferred methods include one or more of the following features. The pressing step and curing step are performed simultaneously. The first curing step is preferably achieved by radiation curing, most preferably by electron beam radiation curing. The applying step is preferably performed by airbrush coating.

Other features and advantages of the invention will be apparent from the following detailed description, the drawings, and the claims.

DETAILED DESCRIPTION OF PREFERRED EMBODIMENTS

Figure 1:
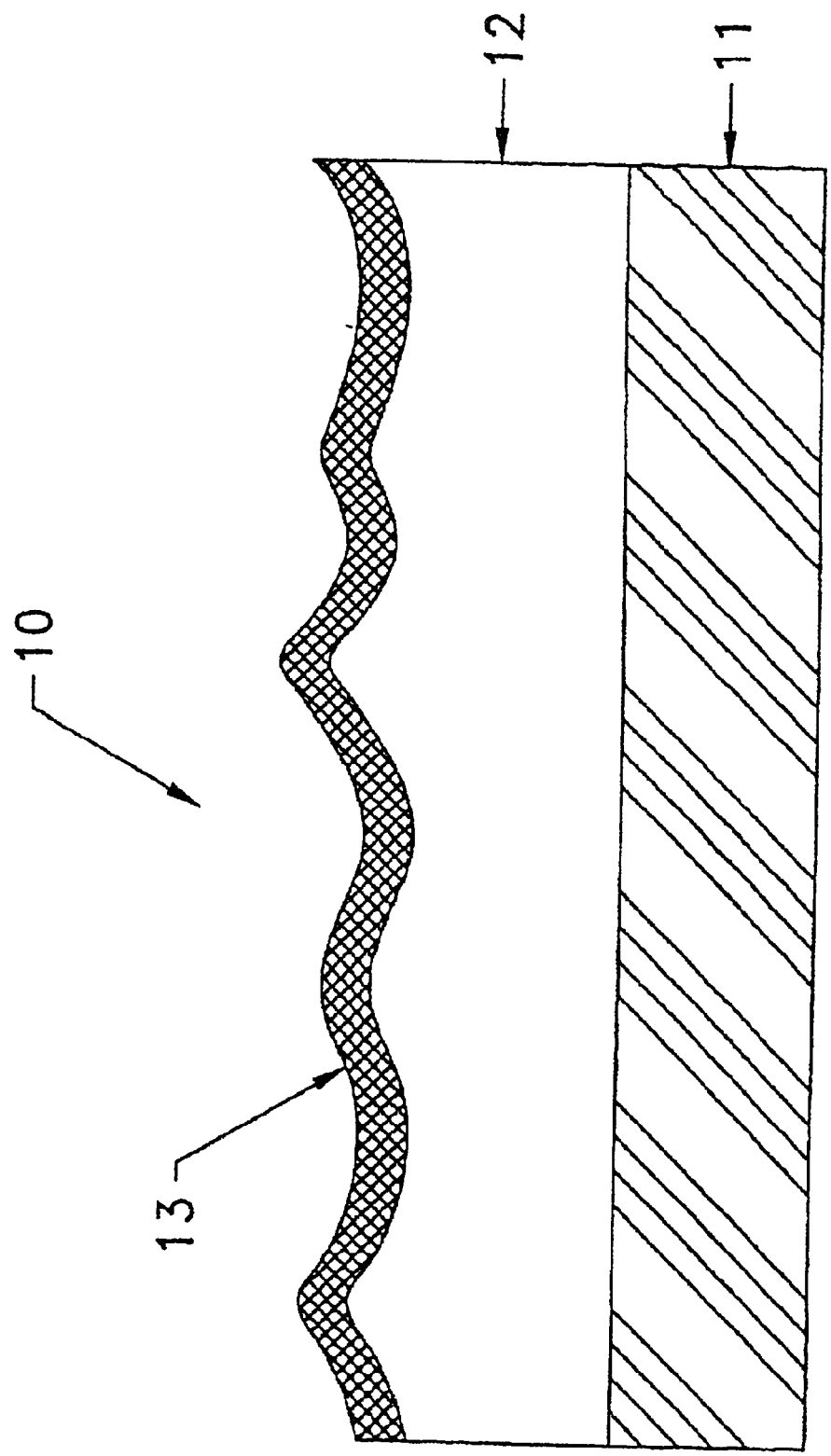
FIG. 1 is schematic side cross section of a portion of a release sheet of the invention.

Referring to FIG. 1, a release sheet 10, comprises a substrate 11, a polymerized acrylic functional coating layer 12 provided on one surface of the substrate and providing a desired surface effect, and a silicone release coating layer 13 provided on the polymerized acrylic functional coating layer 12. The release sheet 10 provides a replicative surface with a desired surface effect at substantially 100% fidelity for use in multicomponent reactive urethane casting systems.

In brief, the polymerized coating layer 12 preferably comprises an acrylated oligomer, a monofunctional monomer, a multifunctional monomer for crosslinking, and a siloxane release agent at 2% or less by total weight of the polymerized coating.

Preferred acrylated oligomers include acrylated urethanes, epoxies, polyesters, acrylics and silicones. The oligomer contributes substantially to the final properties of the coating. Practitioners skilled in the art are aware of how to select the appropriate oligomer(s) to achieve the desired final properties. Desired final properties for the release sheet of the invention typically require an oligomer which provides flexibility and durability. A wide range of acrylated oligomers are commercially available from UCB Chemicals Corporation, such as Ebecryl 6700, 4827, 3200, 1701, and 80, and Sartomer Company, Inc., such as SB-500.

Typical monofunctional monomers include acrylic acid, N-vinylpyrrolidone, (ethoxyethoxy)ethyl acrylate, or isodecyl acrylate (IDA). Preferably the monofunctional monomer is isodecyl acrylate. The monofunctional monomer acts as a diluent, i.e., lowers the viscosity of the coating, and increases flexibility of the coating. Examples of monofunctional monomers include SR-395 and SR-440, available from Sartomer Company, Inc., and Ebecryl 111, available from UCB Chemicals Corporation.

Commonly used multifunctional monomers for crosslinking purposes are trimethylolpropane triacrylate (TMPTA), propoxylated glyceryl triacrylate (PGTA), tripropylene glycol diacrylate (TPGDA), and dipropylene glycol diacrylate (DPGDA). Preferably the multifunctional monomer is selected from a group consisting of TMPTA, TPGDA, and mixtures thereof. The preferred multifunctional monomer acts as a crosslinker and provides the cured layer with solvent resistance. Examples of multifunctional monomers include SR-9020, SR-351, SR-9003 and SR-9209, manufactured by Sartomer Company, Inc., and TMPTA-N, OTA-480 and DPGDA, manufactured by UCB Chemicals Corporation.

The composition may include a reactive or nonreactive silicone, preferably an aminofunctional siloxane, as a release agent. The release agent is added to ensure release of the acrylic functional coating from the replicative surface which imparts the desired surface effect to the polymerized coating. Siloxanes are commercially available from Goldschmidt Chemical Corp., e.g., TEGO Glide ZG-400 and TG RC-704, from Dow Corning Corporation, e.g. 2-8577 Fluid, and from UCB Chemicals Corporation, e.g., Ebecryl 350.

The composition may also include additives. Typical additives include pigments, fillers, defoamers, adhesion promoters, flatting agents, wetting agents, slip aids and stabilizers. In addition, viscosity control additives, such as colloidal silica or volatile solvents, or surface texture materials, such as starch grains or silica, may be included. Moreover, pigments or filler materials such as calcium carbonate, titanium dioxide, clay, silica, and the like may be included to reduce costs of the coating or to create an opaque effect. If ultraviolet radiation is used to cure the acrylic functional coating, the coating must also include a photoinitiator, e.g., Ebecryl BPO and Ebecryl 7100, commercially available from UCB Chemicals Corporation.

Preferably, the acrylic functional coating 12 comprises, before curing, 10 to 50 parts of the acrylated oligomer, 20 to 60 parts of the monofunctional monomer, e.g., isodecyl acrylate, 20 to 60 parts of the multifunctional monomer, selected from a group consisting of TMPTA, TPGDA, and mixtures thereof, and an aminofunctional siloxane release agent at 2% or less by total weight of the acrylic functional coating. More preferably, the aminofunctional siloxane release agent is less than 1%, and most preferably at less than 0.25% by total weight of the acrylic functional coating.

When the aminofunctional siloxane release agent is added in amounts greater than 2% by total weight, the silicone release coating layer 13 does not properly adhere to the acrylic functional coating layer 12. Furthermore, the coating spread characteristics of the aqueous silicone coating are affected, resulting in an unacceptable release and aesthetically undesirable surface effects.

In order for the silicone release coating layer 13 to adhere adequately to the acrylic functional coating, not only should (a) the acrylic functional coating contain as little of a silicone release agent as possible while still allowing the acrylic functional coating to release from the surface that imparts to it its surface effect, e.g., 2% or less by total weight of the acrylic functional coating, but also (b) the silicone release coating layer 13 should contain a sufficient amount of a nonionic surface wetting agent containing polyoxyethylene groups to allow the silicone release coating layer to substantially wet the surface of the acrylic functional coating layer 12, e.g., at least 3% by total dry weight of the silicone release coating.

Polyvinyl alcohol is the coating binder for the silicone release coating. Polyvinyl alcohol is also used to adjust the gloss of the release sheet, and, consequently, the gloss of the final product. Polyvinyl alcohol is commercially available from Air Products and Chemicals, Inc., e.g., Airvol 107, from E. I. du Pont de Nemours and Company, e.g., Elvanol 71-30, and from Hoechst Celanese Corporation, e.g., Mowiol 30-92.

Together, the silicone emulsion, the silicone catalyst, and optionally, the silicone release modifier make up a silicone release system that controls the release properties of the release sheet. The reactive organofunctional siloxane emulsion coating is the primary release component and provides stable release properties. The optional complex reactive organofunctional siloxane release modifier may be included to adjust the release of the film from the surface of the release sheet. The silicone catalyst accelerates the curing of the silicone release layer. Examples of reactive organofunctional siloxane emulsion coatings include Syloff 22 and Syloff 7910, manufactured by Dow Corning Corporation, and PC-188, manufactured by Rhodia Silicones North America. Examples of complex reactive organofunctional siloxane release modifiers include Syloff 7921, manufactured by Dow Corning Corporation, and PC-191, manufactured by Rhodia Silicones North America. Examples of suitable catalysts include Catalyst 164, a tin complex catalyst, and Syloff 7922, a platinum complex catalyst, available from Dow Corning Corporation, and PC-95, a platinum complex catalyst, available from Rhodia Silicones North America.

Preferably the catalyst is a platinum complex catalyst. A platinum complex catalyst is preferred because lower coating viscosity and lower coating solids level may be attained without emulsion breakage, which affects the continuity of the release surface, resulting in unacceptable release and aesthetically undesirable surface effects. Moreover, low viscosity and solids enables the application of very thin coatings, minimizing the alteration of the topography of the underlying acrylic functional coating.

The silicone release coating, used to form silicone release coating layer 13, comprises: 90 parts or less polyvinyl alcohol, more preferably 70 parts or less; 100 parts or less of a complex reactive organofunctional siloxane release modifier, more preferably 50 to 90 parts; 90 parts or less of a reactive organofunctional siloxane emulsion coating, more preferably 50 parts or less; 10 to 20 parts of a catalyst selected from a group consisting of platinum complex and tin complex; and 2 to 12 parts (3 to 20% by total dry weight of the silicone release coating) of a nonionic surface wetting agent containing polyoxyethylene groups, more preferably 4 to 8 parts. Preferably the nonionic wetting agent is a silicone glycol copolymer wetting agent.

To achieve proper spread of the silicone coating on the acrylic functional coating, at least 3% of a nonionic surface wetting agent containing polyoxyethylene groups must be used. When the nonionic wetting agent is added in amounts less than 3% by total dry weight, the surface tension of the silicone coating remains greater than the surface tension of the acrylic functional coating, generally creating poor spread. Poor spread results in unacceptable release values and poor aesthetic characteristics. When the nonionic wetting agent is added in amounts greater than 20% by total dry weight, defects, described variously as "mottle," "craters" and "fish eyes," may appear in the silicone coating itself. The defects in turn result in unacceptable aesthetic characteristics. Suitable nonionic surface wetting agents include alkylaryl polyether alcohols and, preferably, silicone glycol copolymer wetting agents. Examples of silicone glycol copolymer wetting agents include Q2-5211 and Q2-5212, manufactured by Dow Corning Corporation. Examples of alkylaryl polyether alcohols include Triton TX-100 and Triton TX-15, manufactured by Union Carbide.

Surface effects can be characterized as falling into two groups: (1) a surface effect consisting of a shallow pattern, such as simulated leather with a fine grain, or a mirror finish, such as simulated patent leather, which tends to have high gloss; and (2) a surface effect consisting of a deeper pattern, such as a simulated leather with heavy wrinkles, which tends to have low gloss. Gloss of the release sheet is indicated by the 60° gloss of a film cast on its surface, hereinafter "film gloss." A polyvinyl film is spread on the release sheet surface at consistent thickness and then sufficiently cured in an oven. The film is then stripped from the release sheet. The gloss of the surface of the film containing the desired surface effect imparted by the release sheet is measured at a 60° angle using a gloss meter, such as the Progloss gloss meter manufactured by Hunter Associates Laboratory, Inc.

Figure 2:
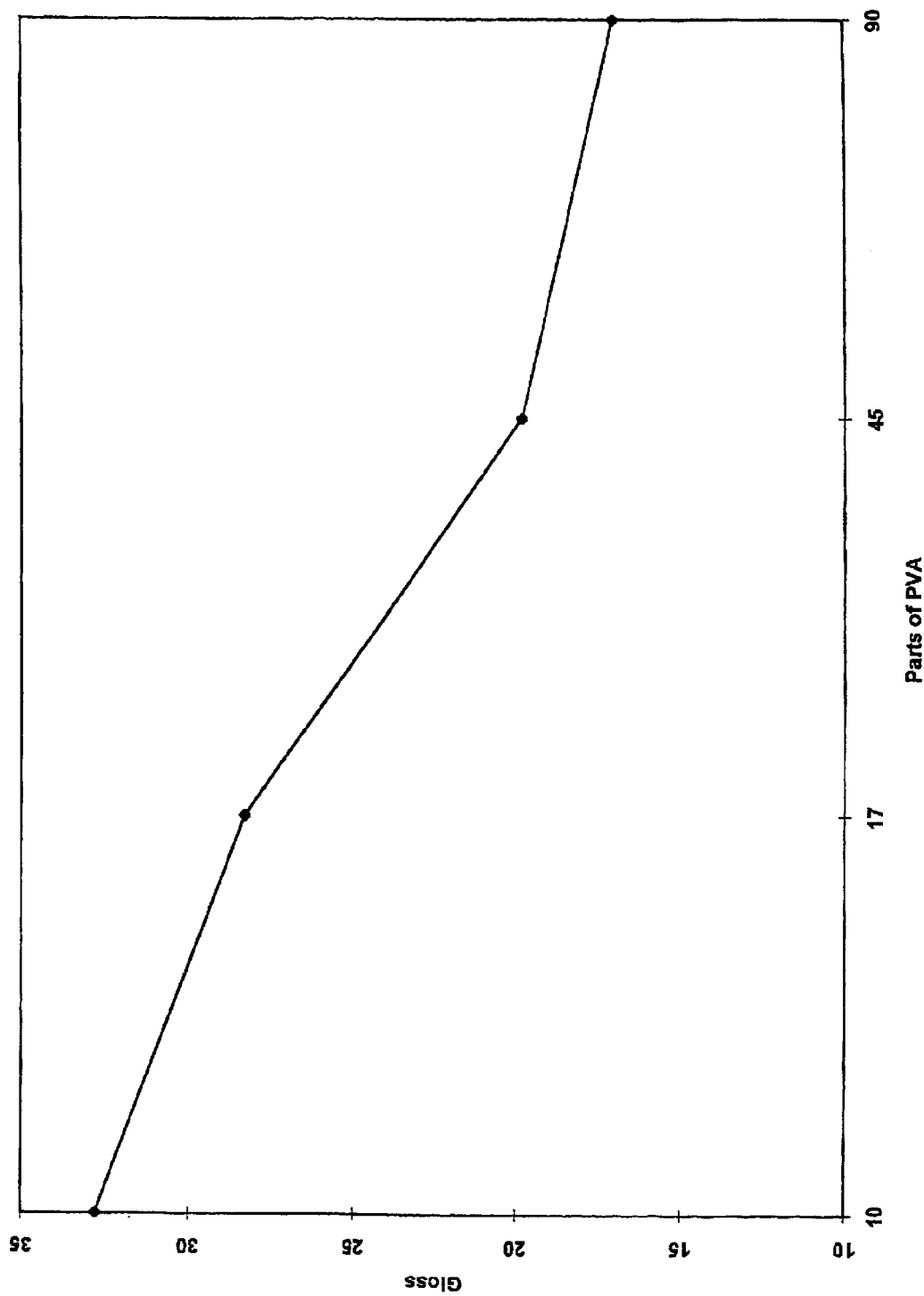
FIG. 2 is a graph showing the 60° gloss of a film cast on the surface of the release sheet of the invention as a function of the amount of polyvinyl alcohol in the film.

For a given type of surface effect, the amount of polyvinyl alcohol in the silicone release coating has the greatest effect on the final product gloss, as measured by the film gloss. FIG. 2 plots the film gloss data as a function of parts polyvinyl alcohol in the silicone release coating, as provided in Table 1. The amount of both the complex reactive organofunctional siloxane release modifier and the reactive organofunctional siloxane emulsion coating have smaller but not insignificant effects on film gloss.

TABLE 1

| Polyvinyl Alcohol (parts) | 60° Film Gloss |
| --- | --- |
| 10 | 32.8 |
| 17 | 28.3 |
| 45 | 19.8 |
| 90 | 17 |

Therefore, for a surface effect with high gloss, e.g., greater than or equal to 20 film gloss, the silicone release coating preferably comprises less than 45 parts polyvinyl alcohol and 50 to 80 parts of a complex reactive organofunctional siloxane release modifier. For a surface effect with low gloss, e.g., less than or equal to 4 film gloss, the silicone release coating preferably comprises 25 to 70 parts polyvinyl alcohol, 60 to 90 parts of a complex reactive organofunctional siloxane release modifier and 20 parts or less of a reactive organofunctional siloxane emulsion coating.

The type of desired surface effect, shallow or deep pattern, also affects the coat weight of the acrylic functional coating because it is this layer that provides the replicative surface. A deeper pattern will require a thicker layer of the acrylic functional coating. Average roughness height values, as determined using the Sheffield Profilometer manufactured by Giddings & Lewis Sheffield Measurement, provide an indication of the depth of the pattern. Therefore, for a shallow pattern, e.g., 290 microinches (7.4 microns), the coat weight of the acrylic functional coating is preferably 25 to 35 lb/3300 ft$^2$ (37 to 52 g/m$^2$). For a deep pattern, e.g., 725 microinches (8.4 microns), the coat weight of the acrylic functional coating is preferably 35 to 55 lb/3300 ft$^2$ (52 to 81 g/m$^2$).

It is very important to control the coat weight of the silicone release coating layer 13 for several reasons. If the coat weight is too low, the continuity of the release surface could be interrupted, resulting in unacceptable release. On the other hand, if the coat weight is too high, the surface effect of the underlying acrylic functional coating may be altered, resulting in significantly less than 100% fidelity. Preferably, the coat weight of the silicone release coating is less than 2.5 lb/3300 ft$^2$ (3.7 g/m$^2$). Moreover, film gloss is affected by coat weight. Therefore, for a surface effect with low gloss, the coat weight of the silicone release coating layer 13 is most preferably 0.5 to 1.5 lb/3300 ft$^2$ (0.7 to 2.2 g/m$^2$). For a surface effect with high gloss, the coat weight of the silicone release coating layer 13 is most preferably 1.0 to 2.5 lb/3300 ft$^2$ (1.5 to 3.7 g/m$^2$). Table 2 shows that there is no significant difference in average roughness height values, before and after the silicone release coating layer is applied, maintaining the high level of fidelity. There is substantially no change in the topography of the underlying acrylic functional coating layer 12 with the addition of the silicone release coating layer 13.

TABLE 2

| Pattern | Acrylic Functional Layer (microinches) | With Silicone Layer (microinches) |
| --- | --- | --- |
| Deep | 717.6 ± 46.5 | 725.4 ± 41.8 |
| Shallow | 287.0 ± 25.5 | 290.9 ± 30.0 |

Note:
Average roughness height values measured with Sheffield Profilometer; Values are an average of 20 readings; and Silicone release coating layer coat weight is 1.1 lb/3300 ft$^2$ (1.6 g/m$^2$).

Figure 3:
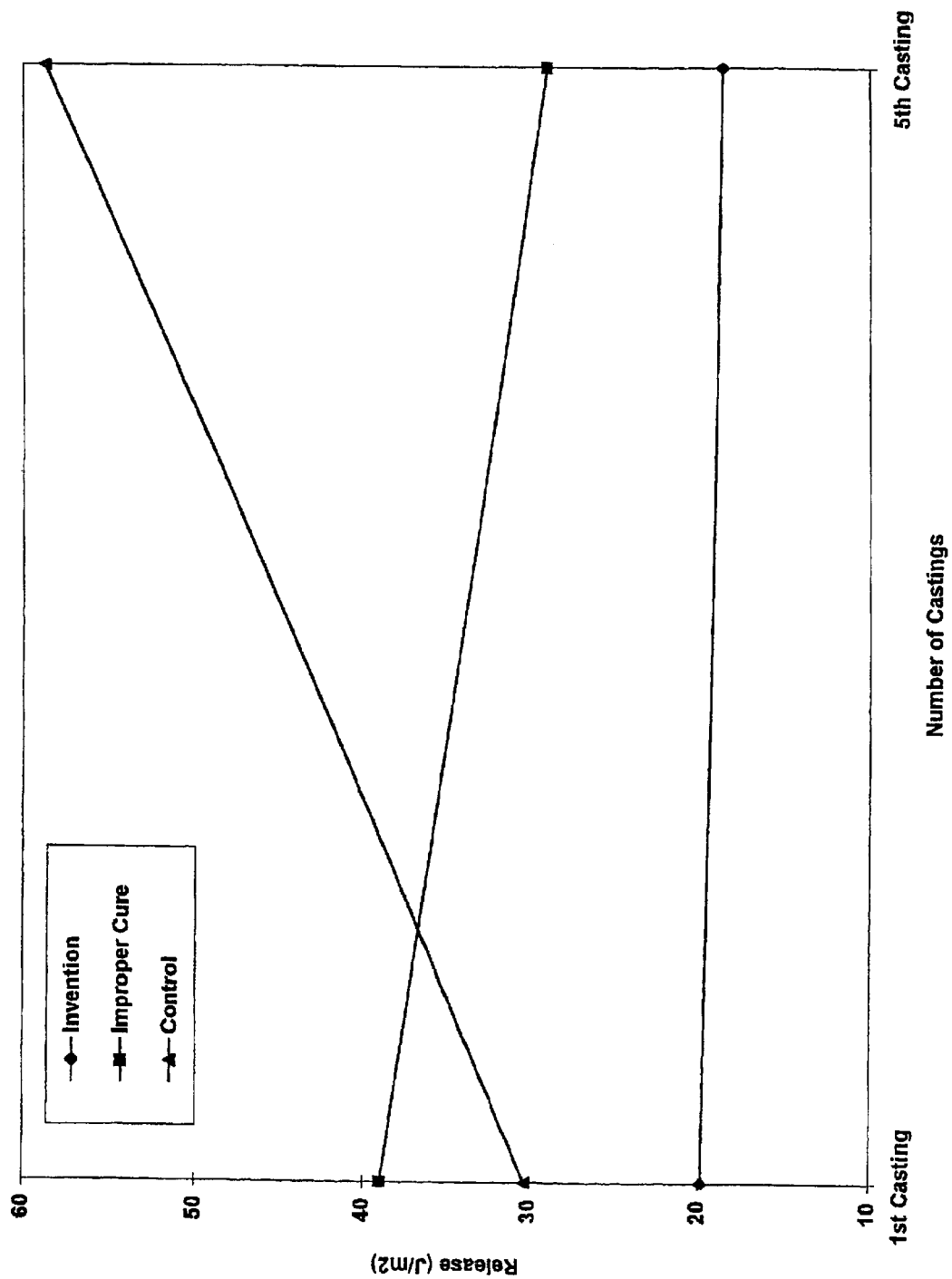
FIG. 3 is a graph showing the release value of a cast polymer from the surface of release sheets as a function of the number of times the release sheets are reused.

The invention provides a number of advantageous properties. A release sheet functions as a temporary mold and is typically reused a number of times before being discarded. The release values in Table 3 were generated by stripping a cast film from the surface of the release sheet using an Osgood-Sutermeister release tester. The tester provides a comparative measurement of the energy required to strip a 3.8 cm by 7.7 cm film sample. Reuse release data are generated by measuring the release energy after a predetermined number of castings on the same release sheet. With each reuse, release values typically increase, eventually reaching unacceptable release values. FIG. 3 graphs the data provided in Table 3. To simulate the release of multicomponent reactive urethane casting systems, a hard releasing aromatic polyurethane film was cast on the release sheet. The release values of the release sheet of the invention remain relatively flat while the values for the control sheet increase with reuse. The control is a conventional release sheet known to release multicomponent reactive urethane casting systems. Stable reuse release values improve productivity because changes in the process in response to changes in release are not required.

TABLE 3

| Sample | Release at 1$^{st}$ Casting (J/m$^2$) | Release at 5$^{th}$ Casting (J/m$^2$) |
| --- | --- | --- |
| Invention | 19.9 | 18.7 |
| Control | 30.3 | 58.7 |

Another property of the invention is the absence of a post-cure change in release. Silicone release sheets often require an "aged" release test because the release will change as the silicone coating continues to cure completely after manufacture. The release properties of the release sheet of the invention remain substantially constant after cure. The lack of this post-cure release change allows for a valid release assessment of the release sheet during production.

The substrate 11 may be any type of sheet-like substrate, e.g., paper, metal foil, and plastic film, preferably paper. The substrate should be generally impervious to penetration of the acrylic functional coating to maximize the efficiency of the acrylic functional coating. The substrate is preferably paper with a base coat to prevent penetration of the acrylic functional coating. Most preferably, the base coat is a clay coating at a coat weight of approximately 6 lb/3300 ft$^2$ (8.9 g/m$^2$).

The most preferred method of applying and curing the acrylic functional coating providing the desired surface effect is disclosed in the aforementioned U.S. Pat. Nos. 4,289,821 and 4,322,450. In brief, the method comprises applying a coating of an electron beam radiation curable composition (the acrylic functional coating) to one surface of a paper web, pressing the coated side of the paper against a replicative surface having the desired surface effect to cause the coating to conform to the replicative surface, irradiating the coating with electron beam radiation to cure the coating, and stripping the paper from the replicative surface with the cured coating adhered to the paper.

The replicative surface is preferably a metal roll with either a pattern engraved in its surface or a highly polished smooth surface. The replicative surface is preferably provided in the coating by a rotating endless surface, such as a roll, drum, or other cylindrical surface, which can be revolved past an electron beam curing device, and, if desired, a coating station. The coating can be applied directly to the paper, before the paper engages the roll, or it can be applied directly to the roll, in which case the paper is pressed against the coated roll.

The acrylic functional coating may be cured by thermal curing, electron beam radiation, or UV radiation. Electron beam radiation is preferred because it can not only penetrate opaque substrates such as paper but also the thick coatings required for certain desired patterns. Other forms of radiation curing such as UV radiation can only penetrate optically clear substrates and not into thick coatings. Electron beam radiation units useful in the present invention are readily available and typically consist of a transformer capable of stepping up line voltage and an electron accelerator. In one type of machine the electrons are generated from a point source, or single, filament and then scanned electromagnetically to traverse the coated object. In another type of machine, the electrons are generated in a curtain from an extended filament, or multifilament, which can irradiate the entire width of the surface without the need for scanning. The entire curing station is enclosed in a lead lined enclosure to prevent stray radiation from leaving the curing station area. It is common when curing coatings with electron beam radiation units to take steps to eliminate oxygen from the surface of the coating. In the present apparatus, a nitrogen atmosphere can be applied. Manufacturers of electron beam radiation units include Energy Sciences, Inc. and RPC Industries.

The silicone release coating may be applied by a variety of coating techniques. Examples of coating techniques include, but are not limited to, bent blade, bevel blade, rod, roll, short dwell, curtain coating, air knife, and air brush. The invention requires a thin layer of the silicone release coating to maintain substantially 100% fidelity and the aesthetics of the surface effect in the underlying acrylic layer, and to maintain the continuity of the silicone release surface to ensure acceptable release and uniform aesthetic characteristics. Consequently, the most preferred coating technology is the air brush which provides a thin but uniform coating layer.

The silicone release coating may be cured by a variety of curing techniques. Examples of curing techniques include convection, conduction, infrared, and combinations thereof. Regardless of the curing method, it is very important to obtain sufficient silicone cure. Improper silicone cure will affect not only post-cure release, but also reuse release values and film gloss. Although cure times and temperatures will vary depending on the particular product and process equipment, a minimum web temperature of 335° F. (168° C.) should be maintained for proper cure. FIG. 3 demonstrates the effect of improper cure on reuse release values.

Other embodiments are within the claims. Various modifications of this invention will become apparent to those skilled in the art without departing from the scope or spirit of this invention.

What is claimed is:

1. A method of manufacturing a release sheet for use in replicative casting of curable systems comprising:
   a) applying an acrylic functional coating layer to a substrate constructed to function as a temporary mold during casting of a curable material;
   b) pressing the coated side of the substrate against a replicative surface including a desired surface effect to cause the acrylic functional coating layer to conform with the replicative surface;
   c) curing the acrylic functional coating layer so that the acrylic functional coating layer includes a mirror image of the desired surface effect to be replicated during casting;
   d) stripping the cured coated substrate from the replicative surface;
   e) applying a silicone release coating layer on an exposed surface of the acrylic functional coating layer wherein the silicone release coating layer is adapted to receive the curable material, to provide acceptable release of a cast film of the curable material, and to allow the surface effect to be substantially replicated in the cast film; and
   f) curing the silicone release coating layer.

2. The method of claim 1 wherein the pressing step and the acrylic functional curing step are performed simultaneously.

3. The method of claim 1 wherein the acrylic functional curing step is achieved by radiation curing.

4. The method of claim 3 wherein the radiation curing is electron beam radiation curing.

5. The method of claim 1 wherein the silicone release coating applying step is performed by airbrush coating.

6. The method of claim 1 wherein the curing step for the silicone release coating maintains a minimum web temperature of 168° C.

7. The method of claim 1 wherein the acrylic functional coating layer comprises an acrylated oligomer and a monomer selected from the group consisting of monofunctional acrylates, multifunctional acrylates and mixtures thereof.

8. The method of claim 7 wherein the silicone release coating layer comprises 90 parts or less polyvinyl alcohol, 100 parts or less of a complex reactive organofunctional siloxane release modifier, 90 parts or less of a reactive organofunctional siloxane emulsion coating, 10 to 20 parts of a catalyst selected from a group consisting of platinum complex and tin complex, and 2 to 12 parts of a nonionic surface wetting agent containing polyoxyethylene groups.

9. The method of claim 8 wherein the catalyst is a platinum complex catalyst.

10. The method of claim 1 wherein the silicone release coating layer comprises 70 parts or less polyvinyl alcohol, 50 to 90 parts of a complex reactive organofunctional siloxane release modifier, 50 parts or less of a reactive organofunctional siloxane emulsion coating, and 4 to 8 parts of a silicone glycol copolymer wetting agent.

11. A method of manufacturing a release sheet for use in replicative casting of curable systems comprising:
   a) applying an acrylic functional coating layer to a substrate constructed to function as a temporary mold during casting of a curable material, the acrylic functional coating layer comprising 10 to 50 parts of an acrylated oligomer, 20 to 60 parts of a monofunctional monomer, 20 to 60 parts of a multifunctional monomer, selected from the group consisting of TMPTA, TPGDA, and mixtures thereof, and an aminofunctional siloxane release agent at 2% or less by total weight of the coating;
   b) pressing the coated side of the substrate against a replicative surface including a desired surface effect to cause the acrylic functional coating layer to conform with the replicative surface;
   c) curing the acrylic functional coating layer so that the acrylic functional coating layer includes a mirror image of the desired surface effect to be replicated during casting;
   d) stripping the cured coated substrate from the replicative surface;
   e) applying a silicone release coating layer on an exposed surface of the acrylic functional coating layer wherein the continuity of the silicone release coating layer is maintained, acceptable release of a cast film from the silicone release coating is achieved, and alteration of the underlying desired surface effect is minimized; and
   f) curing the silicone release coating layer.

12. The method of claim 11 wherein the silicone release coating layer comprises 90 parts or less polyvinyl alcohol, 100 parts or less of a complex reactive organofunctional siloxane release modifier, 90 parts or less of a reactive organofunctional siloxane emulsion coating, 10 to 20 parts of a catalyst selected from the group consisting of platinum complex and tin complex, and 2 to 12 parts of a nonionic surface wetting agent containing polyoxyethylene groups.

13. The method of claim 12 wherein the catalyst is a platinum complex catalyst.

14. The method of claim 11 wherein the silicone release coating layer comprises 70 parts or less polyvinyl alcohol, 50 to 90 parts of a complex reactive organofunctional siloxane release modifier, 50 parts or less of a reactive organofunctional siloxane emulsion coating, and 4 to 8 parts of a silicone glycol copolymer wetting agent.

15. The method of claim 1 or 11 wherein the acrylic functional coating layer is applied in an amount so that after curing the acrylic functional coating layer has a coat weight of about 35 to 85 g/m$^2$.

16. The method of claim 1 or 11 wherein the silicone release coating layer is applied in an amount so that alter curing the silicone release coating layer has a coat weight of less than about 4.0 g/m$^2$.

17. The method of claim 1 wherein surface continuity of the silicone release coating layer is maintained.

* * * * *